United States Patent
Iglehart et al.

(10) Patent No.: US 10,553,006 B2
(45) Date of Patent: Feb. 4, 2020

(54) PRECISE APPLICATION OF COSMETIC LOOKS FROM OVER A NETWORK ENVIRONMENT

(71) Applicant: TCMS Transparent Beauty, LLC, Austin, TX (US)

(72) Inventors: David C. Iglehart, Wimberley, TX (US); Albert Durr Edgar, Austin, TX (US)

(73) Assignee: TCMS Transparent Beauty, LLC, Austin, TX (US)

(*) Notice: Subject to any disclaimer, the term of this patent is extended or adjusted under 35 U.S.C. 154(b) by 0 days.

(21) Appl. No.: 15/511,818

(22) PCT Filed: Sep. 30, 2015

(86) PCT No.: PCT/US2015/053148
§ 371 (c)(1),
(2) Date: Mar. 16, 2017

(87) PCT Pub. No.: WO2016/054164
PCT Pub. Date: Apr. 7, 2016

(65) Prior Publication Data
US 2017/0256084 A1 Sep. 7, 2017

Related U.S. Application Data

(60) Provisional application No. 62/057,371, filed on Sep. 30, 2014.

(51) Int. Cl.
*G06T 11/60* (2006.01)
*G06F 3/0484* (2013.01)

(52) U.S. Cl.
CPC .......... *G06T 11/60* (2013.01); *G06F 3/04845* (2013.01); *G06T 2200/24* (2013.01)

(58) Field of Classification Search
CPC .................... G06T 11/60; G06T 2200/24
See application file for complete search history.

(56) References Cited

U.S. PATENT DOCUMENTS 8,184,901 B2 * 5/2012 Edgar .............. H04N 1/622
382/128
8,582,830 B2 * 11/2013 Edgar .............. H04N 1/622
382/115

(Continued)

OTHER PUBLICATIONS

Authorized Officer Agnes Wittmann-Regis, PCT International Preliminary Report on Patentability in PCT/US2015/053148, dated Apr. 13, 2017; 12 Pages.

(Continued)

*Primary Examiner* — Ryan R Yang
(74) *Attorney, Agent, or Firm* — Fish & Richardson P.C.

(57) ABSTRACT

A method for guiding a user to manually apply cosmetics by overlaying graphical indicators on a real-time image of the user, the method including receiving a real-time image of the area of skin. Generating a registration layer containing a mapping between features of the real-time image and a graphical model of the area of skin. Presenting, for display to a user, a control layer overlaid on the real-time image according to the registration layer, the control layer including at least one indicator of a location on the area of skin where a reflectance modifying agent (RMA) should be applied. Determining, based on the real-time image, that the RMA has been applied to the location on the area of skin. In response to determining that the RMA has been applied to the location on the area of skin, modifying the at least one indicator included in the control layer.

20 Claims, 8 Drawing Sheets

(56) References Cited

U.S. PATENT DOCUMENTS

| | | | |
|---|---|---|---|
| 8,942,775 B2* | 1/2015 | Edgar | A45D 34/041 |
| | | | 600/310 |
| 2006/0104507 A1 | 5/2006 | John | |
| 2007/0035815 A1 | 2/2007 | Edgar | |
| 2007/0255589 A1 | 11/2007 | Rodriguez | |
| 2008/0219528 A1 | 9/2008 | Edgar | |
| 2009/0231356 A1 | 9/2009 | Barnes et al. | |
| 2012/0223956 A1 | 9/2012 | Saito | |
| 2012/0299945 A1* | 11/2012 | Aarabi | G06K 9/00281 |
| | | | 345/589 |
| 2013/0302078 A1 | 11/2013 | Edgar | |
| 2017/0256084 A1* | 9/2017 | Iglehart | G06T 11/60 |

OTHER PUBLICATIONS

Authorized Officer Blaine R. Copenheaver, PCT Search Report and Written Opinion in PCT/US2015/053148, dated Jan. 7, 2016; 15 Pages.
Supplementary Partial European Search Report for Application No. 15847214.2, dated Apr. 3, 2018, 12 pages.
European Search Report for Application No. 15847214.2, dated Jul. 9, 2018, 6 pages.
European Examination Report for Application No. 15847214.2, dated Jul. 31, 2018, 8 pages.

* cited by examiner

PRECISE APPLICATION OF COSMETIC LOOKS FROM OVER A NETWORK ENVIRONMENT

CROSS-REFERENCE TO PRIOR APPLICATION

This patent application claims the benefit of the filing date U.S. Provisional Patent Applications No. 62/057,371 filed Sep. 30, 2014, the subject matter of which is incorporated herein by reference in its entirety.

BACKGROUND

Manual cosmetic applications are imprecise compared to computer-controlled techniques, and this imprecision may make them less effective. For example, the heavy application of a foundation base for makeup may cause an unattractive, caked-on appearance. The selective, precise application of reflectance modifying agents (RMAs) through computer-controlled techniques can provide a more effective, more automated, and less expensive modification of the appearance of skin. Even manual application of cosmetics can be improved through computer-controlled image processing techniques.

Furthermore, applying cosmetics can often be a social activity. Friends may get together to try different cosmetics or perform makeovers on each other. Furthermore, people may visit a professional makeup artist or cosmetologist to obtain a professional makeover. Thus, there is a need to integrate computer controlled cosmetic application into an electronic social network environment.

SUMMARY

In a first general aspect, implementations of the present disclosure include methods for accessing makeup effect using a computing device and applying a makeup effect to area of skin with an electronic applicator device. In some implementations, methods include accessing a plurality of makeup effects for applying RMA to the area of skin. Presenting the plurality makeup effects for display to a user. Receiving a selection of an makeup effect from the plurality of makeup effects to be applied to the area of skin. Obtaining data defining the selected makeup effect, where the data identifies one or more of an RMAs to apply to the area of skin, an amount of RMA to apply to the area of skin, and a location on which to apply RMA. And, sending the data defining the selected makeup effect to a applicator device, wherein the applicator device is configured to map the data to the area of skin and automatically apply RMA to the area of skin according to the data defining the selected makeup effect. Other implementations of this aspect include corresponding systems, apparatus, and computer programs, configured to perform the actions of the methods, encoded on computer storage devices.

These and other implementations can each optionally include one or more of the following features. In some implementations, the plurality of makeup effects include one or more of predefined looks, each of the predefined looks including data identifying one or more RMAs and one or more locations to apply the RMAs in order to apply the predefined look to the area of skin.

In some implementations, the method includes receiving an image of the area of skin, and presenting the plurality of makeup effects includes presenting a graphical user interface (GUI) including the image of the area of skin and the plurality of makeup effects for display to a user.

In some implementations, the method includes modifying the image of the area of skin based on the selected makeup effect to show the user a preview of the selected makeup effect applied to the area of skin.

In some implementations, receiving a selection of an makeup effect from the plurality of makeup effects to be applied to the area of skin includes receiving a user input identifying an RMA and a location on the image of the area of skin to apply the RMA, and where the data defining the selected makeup effect includes data identifying the RMA and the location on the image of the area of skin to apply the RMA.

In some implementations, the method includes receiving an image of the area of skin, and presenting the plurality of makeup effects includes presenting a graphical user interface (GUI) including the image of the area of skin and the plurality of makeup effect. Receiving a selection of an makeup effect from the plurality of makeup effects to be applied to the area of skin includes receiving the selection from the other user.

In some implementations, the method includes receiving, from the applicator device, information about the area of skin, and selecting, based on the information about the area of skin, a set of makeup effects from the plurality of makeup effects for presentation to the user, where presenting the plurality of makeup effects includes presenting the set of makeup effects.

In some implementations, the information about the area of skin includes information obtained by the applicator device from a scan of the area of skin.

In a second general aspect, implementations of the present disclosure include an electronic makeup applicator device that can access a plurality of makeup effects and apply a makeup effect to area of skin. In some implementations, a. device for applying reflectance modifying agents (RMA) to an area of skin includes one or more deposition nozzles, one or more sensors, a display a container that contains the RMA and that is in fluid communication with at least one of the one or more deposition nozzles, one or more processors that are in communication with the one or more sensors, the one or more deposition nozzles, and the display, and a data store coupled to the one or more processors. The data store has instructions stored thereon which, when executed by the at least one processor, causes the one or more processors to perform operations including accessing a plurality of makeup effects for applying reflectance modifying agents (RMA) to the area of skin. Presenting the plurality makeup effects for display to a user. Receiving, from an input device, a selection of an makeup effect from the plurality of makeup effects to be applied to the area of skin. Obtaining data defining the selected makeup effect, where the data identifies one or more of an RMA to apply to the area of skin, an amount of RMA to apply to the area of skin, and a location on which to apply RMA. Mapping the data to the area of skin using a feature map of the area of skin obtained from a scan of the area of skin by the one or more sensors, and causing the one or more deposition nozzles to deposit RMA on the area of skin according the mapped data defining the selected makeup effect.

This and other implementations can each optionally include one or more of the following features.

In some implementations, the plurality of makeup effects include one or more of predefined looks, each of the predefined looks including data identifying one or more RMAs and one or more locations to apply the RMAs in order to apply the predefined look to the area of skin.

In some implementations, the method includes receiving an image of the area of skin, and presenting the plurality of makeup effects includes presenting a graphical user interface (GUI) including the image of the area of skin and the plurality of makeup effects for display to a user.

In some implementations, the method includes modifying the image of the area of skin based on the selected makeup effect to show the user a preview of the selected makeup effect applied to the area of skin.

In some implementations, receiving a selection of an makeup effect from the plurality of makeup effects to be applied to the area of skin includes receiving a user input identifying an RMA and a location on the image of the area of skin to apply the RMA, and where the data defining the selected makeup effect includes data identifying the RMA and the location on the image of the area of skin to apply the RMA.

In some implementations, the method includes receiving an image of the area of skin, and presenting the plurality of makeup effects includes presenting a graphical user interface (GUI) including the image of the area of skin and the plurality of makeup effect. Receiving a selection of an makeup effect from the plurality of makeup effects to be applied to the area of skin includes receiving the selection from the other user.

In some implementations, the method includes receiving information about the area of skin includes information obtained by the applicator device from a scan of the area of skin, and selecting, based on the information about the area of skin, a set of makeup effects from the plurality of makeup effects for presentation to the user, where presenting the plurality of makeup effects includes presenting the set of makeup effects.

In a third general aspect, implementations of the present disclosure include methods for guiding a user to manually apply cosmetics by overlaying graphical indicators on a real-time image of the user. In some implementations, methods include receiving a real-time image of the area of skin. Generating a registration layer containing a mapping between features of the real-time image and a graphical model of the area of skin. Presenting, for display to a user, a control layer overlaid on the real-time image according to the registration layer, the control layer including at least one indicator of a location on the area of skin where a reflectance modifying agent (RMA) should be applied. Determining, based on the real-time image, that the RMA has been applied to the location on the area of skin. In response to determining that the RMA has been applied to the location on the area of skin, modifying the at least one indicator included in the control layer. Other implementations of this aspect include corresponding systems, apparatus, and computer programs, configured to perform the actions of the methods, encoded on computer storage devices.

These and other implementations can each optionally include one or more of the following features. In some implementations, modifying the indicator included in the control layer comprises removing the indicator.

In some implementations, the indicator is a graphical symbol.

In some implementations, the indicator is a representation of the cosmetic on the real-time image of the area of skin.

In some implementations, the method includes sending the control layer and the graphical model of the area of skin to a computing device for display to a second user, where the control layer is mapped to the graphical model according to the registration layer, and where at least one indicator included in the control layer is generated from an input received from the second user, the input identifying the location on the area of skin where the cosmetic should be applied.

In some implementations, the method includes sending the control layer and the graphical model of the area of skin to a second and third computing device for display to a second and a third user, where the control layer is mapped to the graphical model according to the registration layer, and where the at least one indicator includes a first and a second indicator, the first indicator being generated from a first input received from the second user, the first input identifying a first location on the area of skin where a first cosmetic should be applied, and the second indicator being generated from a second input received from the third user, the second input identifying a second location on the area of skin where a second cosmetic should be applied.

In some implementations, the method includes sending the real-time image of the area of skin, the control layer being mapped to the real-time image according to the registration layer to the second and third computing device for display to the second and the third user.

In some implementations, the method includes generating the at least one indicator included in the control layer using an algorithm for detecting blemishes on the area of skin.

In some implementations, the algorithm for detecting blemishes on the area of skin includes obtaining a regional image layer comprising regional median values around each pixel of a frame of the real-time image of the area of skin. Obtaining a spot image layer comprising blurred average values across areas centered at each pixel of the frame of the real-time image of the area of skin. Determining a correction image layer based on the regional image layer and the spot image layer. Identifying at least one local minima in the correction image layer, where the at least one indicator included in the control layer is generated from the at least one local minima in the correction image.

In some implementations, modifying the at least one indicator included in the control layer includes determining whether a sufficient amount of the RMA has been applied to the location by preforming the algorithm for detecting blemishes on the area of skin, and adjusting a color, size, shape, or opacity of the at least one indicator.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides handheld devices for implementing the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
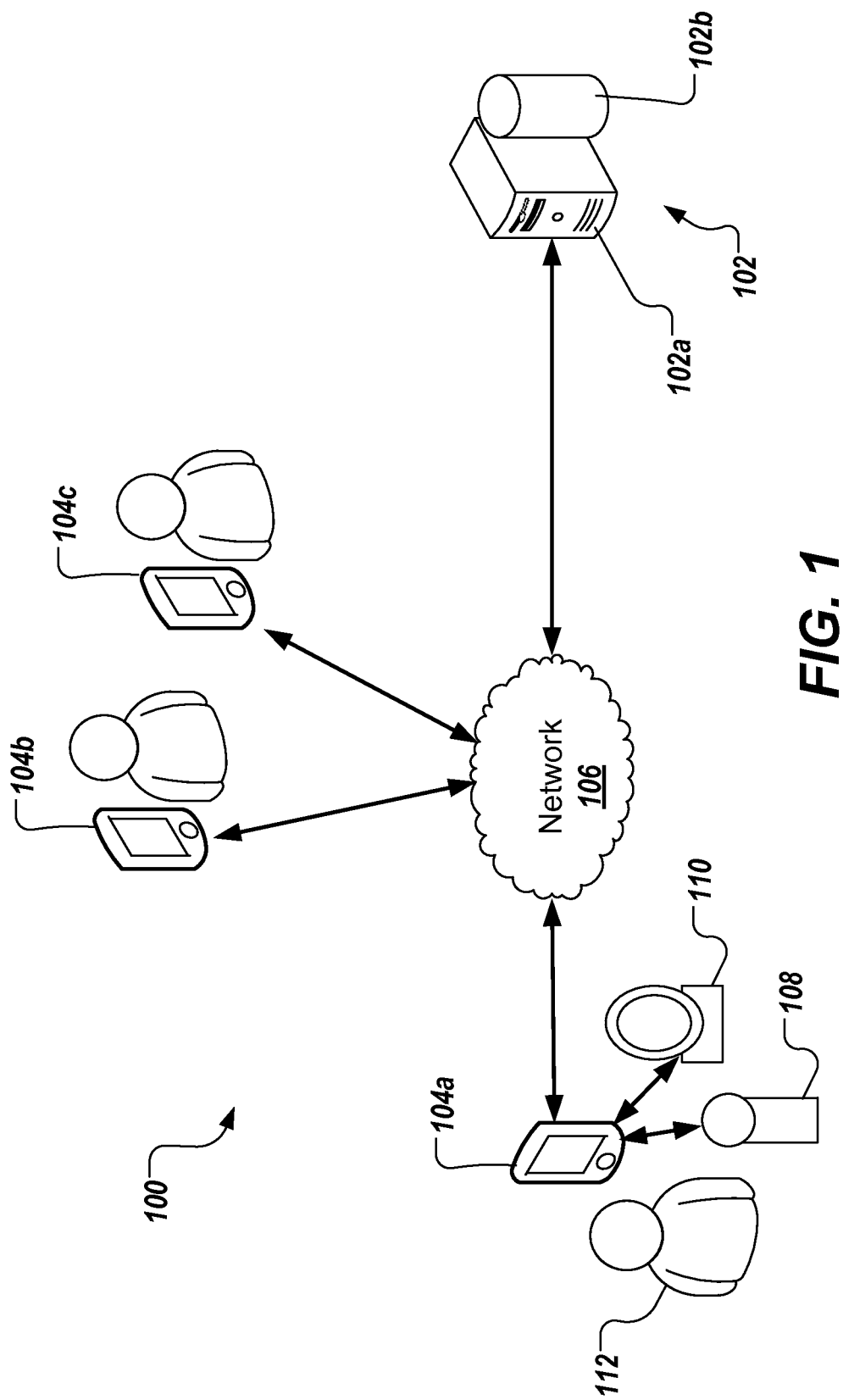
FIG. 1 depicts an example system that can execute implementations of the present disclosure.

Implementations of the present disclosure generally build on apparatus and methods disclosed in each of U.S. patent application Ser. No. 11/503,806 (US20070035815), entitled "System and Method for Applying a Reflectance Modifying Agent to Improve the Visual Attractiveness of Human Skin," and filed on Aug. 14, 2006, U.S. patent application Ser. No. 12/029,524 (US20080194971), entitled "System and Method for Applying a Reflectance Modifying Agent Electrostatically to Improve the Visual Attractiveness of Human Skin," and filed on Feb. 12, 2008, U.S. patent application Ser. No. 12/028,836 (US20080219528), entitled "System and Method for Providing Simulated Images through Cosmetic Monitoring," and filed on Feb. 11, 2008, U.S. patent application Ser. No. 12/028,835 (US20080193195), entitled "Handheld Apparatus and Method for the Automated Application of Cosmetics and Other Substances," and filed on May Feb. 11, 2008, U.S. patent application Ser. No. 12/029,534 (US20080192999), entitled "System and Method for Applying a Reflectance Modifying Agent to Change a Person's Appearance Based on a Digital Image," and filed on Feb. 12, 2008, and U.S. patent application Ser. No. 12/129,624 (US20090025747), entitled "Apparatus and Method for the Precision Application of Cosmetics," and filed May 29, 2008. The disclosures of the above-identified patent applications are expressly incorporated herein by reference in their entireties.

In the present disclosure, the term reflectance modifying agent (RMA) refers to any compound useful for altering the reflectance of skin. Examples RMAs can include cosmetics, inks, dyes, pigments, bleaching agents, chemically altering agents, and other substances that can alter the reflectance of human skin and other features. An RMA composition is a composition that includes at least one RMA. An RMA composition can include other ingredients such as a moisturizer, a carrier, or an active ingredient such as a beneficial compound. A transparent RMA can be provided as a dye, although dilute pigmented RMAs are essentially transparent also. An opaque RMA can include high refractive index particles. In one example of pigmented cosmetics, the term "high refractive index particles" refers to particles having a refractive index of 2.0 or greater.

The term frexel is defined as a small pixel-like region of the skin, which may represent a single large pixel or a small number of pixels. More specifically, a pixel refers to the area of the deposition on a surface immediately below the deposition aperture of a cosmetic applicator, for example, an electrostatic airbrush applicator. For some embodiments, a pixel may represent an area of ⅟₁₅" to ⅕".

The term skin is used not only to refer to skin as on the surface of the human body, but also to refer more broadly to any human feature that may be enhanced cosmetically, for example, fingernails, hair, and other keratinaceous surfaces. The term skin includes, but is not limited to, areas of human skin including the face, head, neck, torso, back, legs, arms, hands, and feet.

The term "middle spatial frequencies" means features or frequencies in the approximate range of 1.5 to 8 mm on a face and 2-16 mm on a leg. In the spatial frequencies between 2 mm to 12 mm, weaker waves below for example 10% peak to peak reflection can be attenuated, but stronger waves can be retained. In the range 0.5 to 2 mm, the same can be done with a higher threshold, below 0.5 mm the spatial frequency waves can be retained. In the range 12 to 25 mm, the same threshold can be applied under restricted control. Filtering or partial camouflaging of middle spatial frequencies means selectively applying RMA in a manner to disguise or cover middle spatial frequency features such as age spots.

The term "differentiated RMA" means an RMA that is deliberately selected to be darker (have less luminance) or lighter (have more luminance) than a desired skin color. The term "highly differentiated RMA" means an RMA that is deliberately selected to be substantially darker or lighter than a desired skin color. Technically, a highly differentiated RMA is typically at least 85% saturated in the red channel and is selected along an extension of the vector between the actual local skin reflectance and the desired skin reflectance. In the example of lightening a dark feature, a highly differentiated RMA might look pink. The term "skin color" means the skin's hue, chroma, and luminance. Perceived skin color is influenced by factors such as the actual skin color, lighting, and texture.

The term "opacity" means the amount of coverage that the RMA provides over the substrate surface. There are two extremes. If a cosmetic is 100% opaque, a viewer would see the pure bulk color of the cosmetic. If a cosmetic is perfectly transparent, that is 0% opaque, a viewer would see the pure skin color under the cosmetic. If a cosmetic is 50% opaque, a viewer would see a 50-50 average of the cosmetic and skin color.

The term illuminator refers to a light source that is used to illuminate a portion of a surface. Illuminators are typically controllable so that data from various lighting arrangements can be used to correct for ambient light and to obtain accurate reflectance or surface profile data. Illumination states or illumination conditions refers to various combinations of a plurality of sensors in ON or OFF states. The term LED refers specifically to a light emitting diode, and more generally to an example of an illuminator.

The term sensor refers to a photodiode, phototransistor, or other optical detector. In some embodiments, a camera functions as one or more sensors. The housing may be shapes other than annular.

An "applicator device" is a device that applies an RMA to the skin. In this specification, the applicator device may be a sprayer, including an electrostatic sprayer or airbrush sprayer, a drop control device, or other apparatus. A "deposition element" is a portion of an applicator device that applies an RMA, such as a sprayer, a drop control element, or both. A "scanning and applicator device" scans a portion of the skin and uses scan data to control a deposition of one or more RMA. An example of a drop control element is an inkjet print head where individual droplets are precisely controlled. An example of a non-drop control element is a sprayer. Spray devices are non-drop control techniques where droplets are produced and controlled only in aggregate. The term reflectance is the ratio, provided as a percentage, of light reflected from a surface to the light impinging on the surface. The terms optical density, or density can refer to a measure of the reflection of the skin. In this specification, an "initial reflectance" reading is an initial reflectance reading from a sensor, before compensating for distance or tilt. An "adjusted reflectance" reading compensates the initial reflectance reading for distance and tilt of a surface from a sensor ring. Adjusted reflectance is a reflectance reading corrected for device height and tilt relative to the skin surface. A "desired density level" is typically a desired level of smoothing for an area of skin, such as threshold for lightening skin, darkening skin, or both. An "average density" over an area of skin may be used as the desired density level. The term "RMA application density" refers to the mass per unit area of RMA applied to a surface.

The term handheld includes devices that are self-contained in a housing that may be held in a hand as well as devices where a housing is tethered to power supply and/or computer.

The term "look" refers to a cosmetically changeable appearance. That is, a look can be created or modified using RMAs such as cosmetics, make-up, hair coloring, nail polish, etc. Generally, a look refers to a cosmetically changeable appearance of one's face; however, the term look can include the changeable appearances of other areas of the body, for example, body art. A look may include a general style. For example, an eighties-look may include bright colored makeup such as light-blue or fuchsia eyeshadow, bright pink lipstick, and colored highlights in the hair. By contrast, a goth-look may include pale foundation with dark eye make-up and lipstick. A goth look also may include dark hair coloring and nail polish, and designs, such as stars or tears near the eyes. A look also may include celebrity make-up styles. For example, a Jennifer Aniston look may include cosmetic styles commonly used by Jennifer Aniston, or a style that Jennifer Aniston wore on a particular occasion (e.g., to the Emmy Awards).

The term "looks ecosystem" refers to a social internet based environment that allows users to personalize their appearances. A looks ecosystem can establish an interactive relationship among users and between users, style professionals, and cosmetic producers for the exchange of styles, images, products, software applications, and advice. For instance, a looks ecosystem can be a virtual community that promotes exchanges not only for cosmetics, but for many other effects, such as special looks by makeup artists, hair streaking, and tattoos, in short, for anything people want to do to personalize their appearances.

The term "makeup effect" includes pre-defined looks such as an eighties-look, goth-look, or Jennifer Aniston look, as described above, in addition to individual cosmetic options that one may use to create a customized look. For example, makeup effects can include types and shades of cosmetics from which a user can select to define their own look, or a look for another user, through a user interface, such as though a looks ecosystem. A makeup effect can include special looks by makeup artists, hair streaking, body art tattoos, and custom application of skin care products. A makeup effect can be defined by data identifying, for example, types, colors, shades, opacities, and amounts of RMAs that constitute the makeup effect and locations on an area of skin for the RMAs to be deposited to apply the makeup effect to the skin. A more precise makeup effect can also be defined by data identifying, for example, a reflectance, including intensity and color, for locations on an area of skin that constitute the makeup effect. Types, colors, shades, opacities, and amounts of RMAs to be applied to locations of the skin can be determined for individual users based comparing the reflectance of the makeup effect to the users' own skin.

The term "real-time" refers to transmitting or processing data without intentional delay given the processing limitations of a system, the time required to accurately obtain data and images, and the rate of change of the data and images. For example, a "real-time" image of a user should give the appearance that the image is changing instantaneously with the movements of the user (e.g., as if viewing an image in a mirror). Although there may be some actual delays, the delays are generally imperceptible to a user.

According to one aspect, implementations of the present disclosure are generally directed to apparatus and methods for rapid and precise application of personalized makeup effects to skin. Implementations of the present disclosure provide a user with access to libraries of predefined looks and/or an interface to define their own looks, or looks for another user. Implementations of the present disclosure allow a user to obtain data defining a desired makeup effect. In some implementations, the data can be obtained through a network connection with a computing device and transferred, by wired or wireless connection, to an applicator device. In some implementations, an applicator device can include a display, input controls, and a network connection; and obtain data defining a desired makeup effect directly, without the aid of a separate computing device. The applicator device can apply RMA in register with the data defining the makeup effect to apply the makeup effect to an area of skin. In some implementations, one or more sensors, such as one or more cameras, and an image processing system view an area of skin. A processor activates a deposition system to apply one or more RMAs a location known to the processor relative to an image of the skin.

According to another aspect, implementations of the present disclosure are generally directed to apparatus and methods for creating a collaborative makeover environment. Implementations of the present disclosure provide for the generation of digital graphic layers that allow users to collaboratively create customized looks for themselves or other users. Implementations of the present disclosure display an image of a user to one or multiple other users. Any of the users can apply makeup effects to a control layer of the image. The effects applied to the control layer can be mapped to a real-time video image of the user so as to preview the makeup effects on the use. In some implementations, data defining the makeup effects in the control layer can be obtained and transferred to an applicator device to allow the user to apply the makeup effect to their skin. Such implementations permit collaboration through a looks ecosystem using at least one computing device and enable users to participate with other individuals or groups, to make cosmetic choices through shared input from others.

In some implementations, the makeup effect can be depicted as indicators (e.g., symbols and markings) to guide the user in manually applying the makeup effect. For example, a remote user (e.g., a professional cosmetologist) may draw and erase symbols and lines on the control layer of an image of a local user to guide the local user to manually apply cosmetics. The symbols and lines are mapped to real-time images of such that they track the movements of the local user. In some implementations, the real-time image of the local user moves dynamically with the user's movements as if the local user is looking in a mirror, while the remote user views a graphical model image of the local user that remains stationary while making markings on a control layer. Implementations of the present disclosure provide a registration layer to perform mapping between the different image layers of the local user and the real-time image. The indicators can be modified or erased as the local user manually applies a cosmetic, for example, to confirm that the user has applied the cosmetic accurately or to guide the user in correcting an incorrect application of the cosmetic.

According to another aspect, implementations of the present disclosure are generally directed to apparatus and methods for aiding a user to manually apply cosmetics to an area of skin. Implementations of the present disclosure provide for the generation of digital graphic layers that overlay graphical indicators on a real-time image of a user to guide the user in applying cosmetics to the user's skin. The graphical indicators can be generated from a user selected makeup effect such as a predefined look. Implementations can monitor the user's manual application of cosmetics and modify characteristics of the indicators in real-time as the user applies cosmetics to indicated locations on their skin. In some implementations the indicators can be generated from an algorithm that detects blemishes in the user's skin and determines RMA application amounts and locations to touch up the blemishes while leaving the underlying natural variety and beauty of the consumer's skin. Implementations can repetitively perform the algorithm and modify or remove the indicators as the user touches up blemishes by applying cosmetics.

FIG. 1 depicts an example system 100 that can execute implementations of the present disclosure. The example system 100 includes a computing system 102 in communication with user computing devices 104a, 104b, 104c, over one or more networks 106. Network 106 can include a large network or combination of networks, such as a local area network (LAN), wide area network (WAN), the Internet, a cellular network, a satellite network, one or more wireless access points, or a combination thereof connecting any number of mobile clients, fixed clients, and servers.

The computing system 102 can include a computing device 102a and computer-readable memory provided as a persistent storage device 102b, and can represent various forms of server systems including, but not limited to a web server, an application server, a proxy server, a network server, or a server farm. Furthermore, the computing device 102a can include one or more processors for executing instructions stored in storage device 102b and/or received from one or more other electronic devices, for example over network 106. In addition, these computing devices 102a also typically can include network interfaces and communication devices for sending and receiving data.

The user computing devices 104a, 104b, 104c can be any of a number of different types of computing devices including, for example, mobile phones; smartphones; personal digital assistants; laptop, tablet, and netbook computers; and desktop computers including personal computers, special purpose computers, general purpose computers, and/or combinations of special purpose and general purpose computers. The user computing devices 104a, 104b, 104c typically can have internal or external storage components for storing data and programs such as an operating system and one or more application programs. In particular, the internal or external storage components for user computing devices 104a, 104b, 104c can store a client application for interfacing with computing system 102 (e.g., a looks ecosystem application).

Additionally or alternatively, the user computing devices 104a, 104b, 104c can be configured to interface with computing system 102 without a specific client application, using, for example, through a web browser.

The user computing devices 104a, 104b, 104c also typically include a central processing unit (CPU) for executing instructions stored in storage and/or received from one or more other electronic devices, for example over network 106. The user computing devices 104a, 104b, 104c also include one or more communication interfaces for sending and receiving data. One example of such communications interfaces is a modem. Other examples include antennas, transceivers, communications cards, and other network adapters capable of transmitting and receiving data over a network (e.g., network 106) through a wired or wireless data pathway.

The system 100 also includes applicator devices 108 and 110. The applicator devices 108 and 110 can be an electronic cosmetic applicators that apply RMA, such as cosmetics, to the skin of a user 112. The applicator devices 108 and 110 include a one or more processors for executing instructions stored in storage and/or received from one or more other electronic devices, for example from user computing device 104a. The applicator devices 108 and 110 also include one or more communication devices for sending and receiving data. The applicator devices 108 and 110 may communicate with user computing device 104a through a wired communication channel (e.g., a universal serial bus (USB) connection) or a wireless communication channel such as a WAN (e.g., WiFi) or a personal area network (PAN) (e.g., Bluetooth). The applicator device 108 is a handheld applicator device and the applicator device 110 is a booth applicator device.

Figure 2:
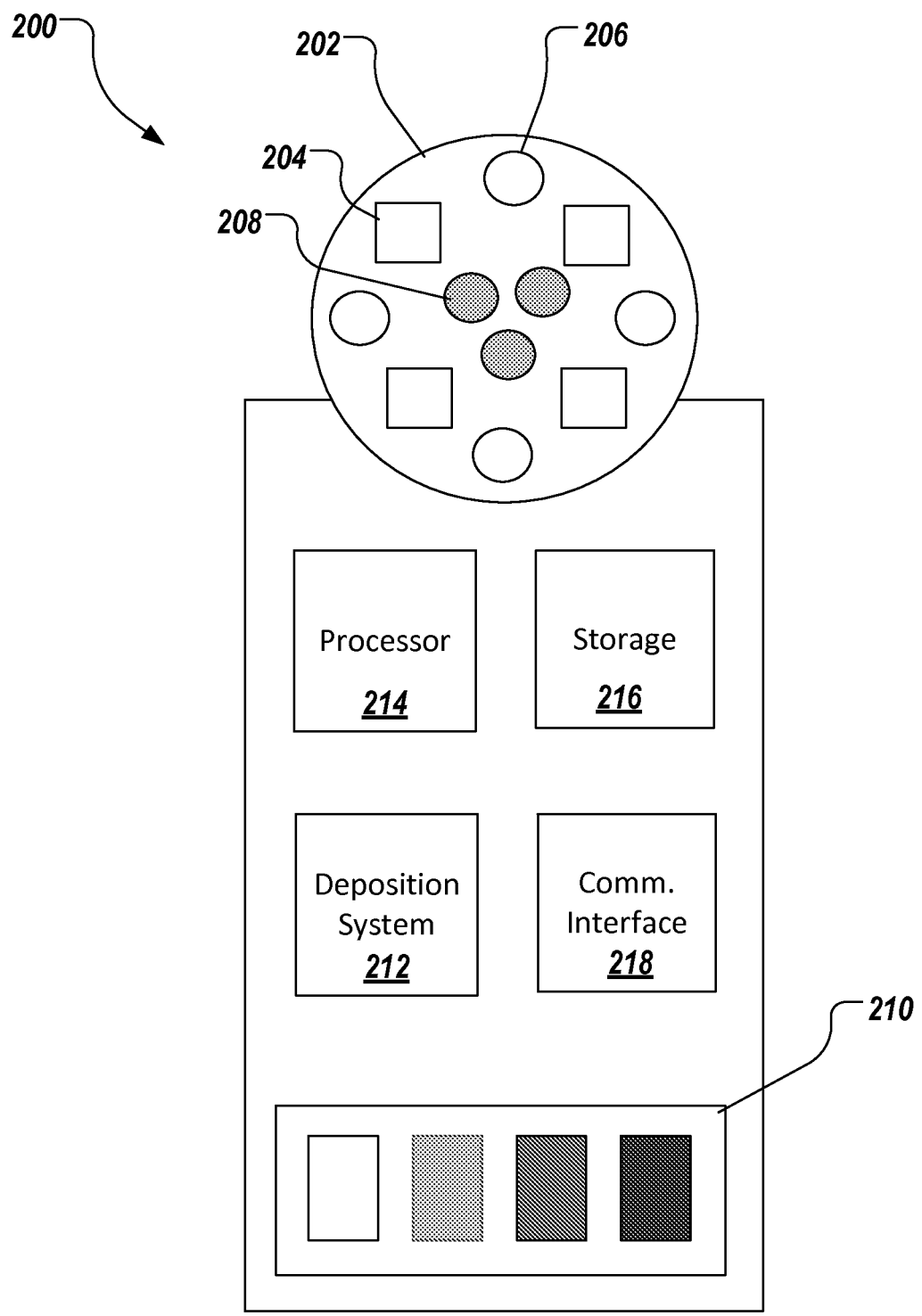
FIG. 2 illustrates a block diagram of an example applicator device.

FIG. 2 illustrates a block diagram of an example applicator device 200, such as applicator devices 108 or 110 of FIG. 1. The applicator device 200 includes an illumination dome 202. The illumination dome 202 provides a source of illumination that can provide uniform distribution of light. The illumination dome 202 further enables an adequate intensity of the distributed light for sensing the skin to be treated.

The illumination dome 202 includes one or more illuminators 204 and at least one sensor 206. In some implementations, the illuminators 204 are provided as one or more green LEDs. Green is a beneficial lighting color for collecting data about blemishes on skin. Further, green light can provide improved visibility of skin conditions relative to red or other wavelengths. In some implementations, the illuminators 204 includes LEDs positioned a short distance from a filter, discussed in further detail below, on the same side as a sensor, also discussed in further detail below. In this manner, the illuminators provide ample light for reflectance measurement. In some implementations, a high brightness of the LEDs permits the applicator device 200 to be effective in ambient lighting conditions. In addition, the illumination dome 202 includes at least one sensor 206, for example, a camera to obtain images of the skin.

The applicator device 200 further includes a nozzle 208. The nozzle 208 is a deposition element that provides an outlet of the deposition system, and is used to jet one or more RMAs onto the surface to be treated. In some implementations, multiple nozzles 208 may be used to increase the speed of deposition. For example, three nozzles 208 can be provided. Each nozzle 208 can correspond to the same RMA (e.g., type and/or color), or can correspond to different RMAs (e.g., type and/or color). In some implementations, each 208 nozzle can be activated to deposit an RMA when a target area is directly underneath the particular nozzle 208, and can be activated independently of the other nozzles 208. In some implementations, a chamber of a booth includes an array of nozzles 208 to provide uniform coverage of RMA deposition over an area of skin, (e.g., a face).

One or more removable reservoirs 210 are provided. Each removable reservoir 210 can be provided as a cartridge that contains an RMA. In some implementations, a single reservoir 210 is provided, such that the applicator device 200 deposits a single RMA (e.g., type and/or color). In some implementations, multiple reservoirs 210 are provided, such that the applicator device 200 deposits one or more different RMAs (e.g., type and/or color). The reservoir 210 is in fluid communication with the nozzle 208 through a deposition system 212. The deposition system 212 can include fluid channels (e.g., conduits), valves, and a pressure source (not shown). The deposition system 212 can be used to control the transfer of RMA from the reservoir 210 to the nozzles 208 for application to an area of skin.

The applicator device 200 further includes a processor 214 for executing instructions stored in electronic storage 216. The processor 214 controls the illuminators 204, sensor 206, and deposition system 212 to obtain images of areas of skin and control deposition of RMA on the skin. In addition, the processor 214 executes instructions to perform operations as described in more detail below.

The applicator device 200 also includes a communications interface 218 to communicate with a user computing device 104a or computing system 102 (FIG. 1). The communications interface 218 can be a wired or wireless interface. For example, the communications interface 218 can be a USB, WiFi, Bluetooth, or a mobile telecommunications (e.g., 4G, LTE) interface. In some implementations, a mobile communication device may be integrated with the applicator device 200. For example, the applicator device 200 can include a display and an input interface (e.g., a keypad or touch screen).

In some implementations scanned attributes of an area of skin or other feature are identified, and the automatic and precise deposition of one or more RMAs can be initiated on the area. In some implementations, the applicator device 200, is moved manually back and forth across the area in multiple passes, to continually scan and determine values of one or more attributes of the area relative to one or more threshold values. Example attributes can include lightness and darkness of the area of skin. The one or more threshold values can be set by means of the software and can correspond to a cosmetic improvement in the appearance of the area. In some implementations, the applicator device automatically deposits the one or more RMAs until the measured attribute values achieve the threshold value. For example, the applicator device can automatically deposit the one or more RMAs until the measured attribute values exceed or fall below the threshold value. In some implementations, the threshold value can correspond to a target value, where the applicator device automatically deposits the one or more RMAs until a difference between a measured attribute value and the threshold value falls below a threshold difference.

Different implementations may be used to treat a relatively large skin area such as a face, arm, and/or leg. Other implementations may be used to selectively treat only one or a few skin features of interest to the user without moving a scanning or deposition element over other areas of the skin.

In some implementations, the movement of the applicator device may be random in the sense that the processor may not have control over the location of the point of deposition. For example, a user may move the applicator device over the skin in random patterns. In other implementations, the applicator device may be in a fixed position, but the user may move relative to the applicator device in random patterns. For example, the applicator device may be installed in a booth.

The processor may be programmed to know at any time the location of an aim point of potential deposition if the processor gave the command to fire. In this case, the aim point is said to be "nominated" by the, in some ways, random motion of the hand. The processor has the choice of "electing" the nominated point by "firing," or otherwise applying the cosmetic at that point, or may choose to wait for the next nominated point based on the movement of the hand, over which the processor is aware but does not have direct control. This is referred to as the "random nomination" approach, as distinguished from a system in which the processor has the ability to aim a deposition directly at a defect that it chooses.

Figure 3:
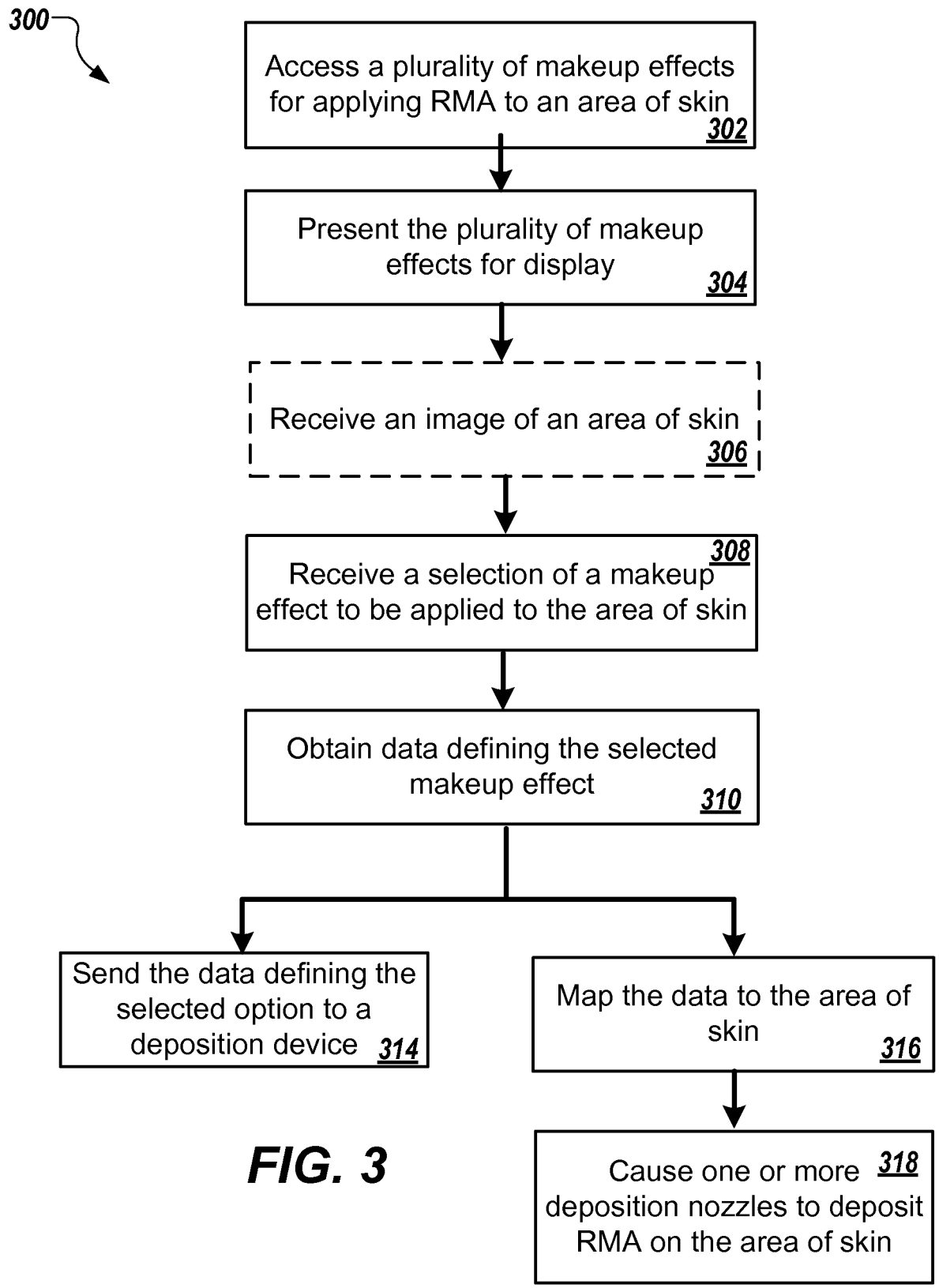
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. In some examples, the process 300 is executed to allow a user to choose or create a makeup effect and apply the makeup effect to an area of skin. In some examples, the process 300 is executed from a looks ecosystem application executing on user computing device or an applicator device. In some examples, the process 300 is executed by accessing a looks ecosystem website with a user computing device or an applicator device.

A plurality of makeup effects for applying RMA to the area of skin are accessed (302). For example, the makeup effects can be accessed from a server such as computing device 102 of FIG. 1. The accessed makeup effects can include pre-defined looks such as eighties-looks, goth-looks, or looks styled after other people such as celebrities or fashion models. Furthermore, makeup effects can include individual cosmetic options that a user may use to create a customized look. The makeup effects are presented for display to a user (304). The makeup effects can be presented in a graphical user interface (GUI) such as the example GUI 400 shown in FIG. 4 and described below.

An image of the area of skin can, optionally, be received (306). The image can be a static image captured or uploaded by the user. The image can be a real-time video image of the user, for example, captured by a camera on the user's computing device. The image can be an image of the area of skin obtained from a scan by an applicator device. The image can be presented to the user along with the plurality of makeup effects in a GUI, for example, to allow the user to preview makeup effects and create customized makeup effects.

A user selection of a makeup effect to be applied to the area of skin is received (308) and data defining the selected option is obtained (310). For example, a makeup effect can be defined by data identifying, for example, types, colors, shades, opacities, and amounts of RMAs that constitute the makeup effect and locations on an area of skin for the RMAs to be deposited to apply the makeup effect to the skin.

A more precise makeup effect can also defined by data identifying, for example, a reflectance, including intensity and color, for locations on an area of skin that constitute the makeup effect. In other words, the makeup effect may be defined in terms of expected reflectance of a user's skin after the makeup effect is applied. Types, colors, shades, opacities, and amounts of RMAs to be applied to locations of the skin can be determined for individuals users based comparing the reflectance of the makeup effect to the users' own skin. For example, the actual reflectance of frexels on the user's own skin can be determined from one or more images of the user's skin from a scan using an applicator device. An error image can be calculated that describes the difference between the expected reflectance of the user's skin after application of the makeup effect and the actual reflectance of frexels on the user's skin. The error image can be used to determine the types, colors, shades, opacities, and amounts of RMAs to be applied to frexels of the user's skin so as to modify the reflectance of the user's skin to attain the desired makeup effect.

In some implementations, the data defining the selected makeup effect is sent to a deposition device (314) such as an applicator device. (For example, if process 300 is performed by a user computing device, the user computing device can send the data defining the selected makeup effect to an applicator device. The applicator device can map the data to the area of skin and automatically apply RMA to the area of skin according to the data defining the makeup effect.

In some implementations, process 300 is performed by an applicator device such as an applicator device with an integrated computing device. In such implementations, the applicator device maps the data defining the selected makeup effect to the area of skin (314). For example, the applicator device can map the data defining the selected makeup effect to the area of skin using a feature map of the area of skin obtained from a scan of the area of skin by the one or more sensors. Once mapped, the applicator device can cause one or more deposition nozzles of the device to deposit RMA on the area of skin according the mapped data defining the makeup effect (318).

More specifically, the applicator device can create a frexel feature map of the area of skin from images of the area of skin captured from one or more scans performed with the applicator device. A frexel feature map identifies features of the area of skin in those captured images, their locations, and their reflectance patterns. The applicator device can compare analogous features in the data defining the makeup effect and the frexel feature map and uses the data defining the makeup effect to reconstruct the data in the frexel feature map. The mapped data can then be used to apply the makeup effect to the area of skin.

In some implementations, the plurality of makeup effects include predefined looks, for example, an 80's look, a goth look, or a look modeled after a celebrity. A look may be defined by data identifying one or more RMAs and one or more locations to apply the RMAs in order to apply the predefined look to the area of skin. For example, a makeup effect for an 80's look may be defined by data indicating to apply blue eyeshadow and bright pink blush and lipstick. A makeup effect for a goth-look may be defined by data indicating to apply a pale foundation; black eye liner, eyeshadow, and mascara; black or deep red lipstick; and small black stars near the corners of the eyes.

In some implementations, the applicator device can send information about the area of skin to the computing device or to the computing system (e.g., server). The information about the area of skin can be obtained by the applicator device from at least one scan of the area of skin. For example, the information may include attributes of the skin such as, for example, local reflectance of skin, the surface morphology of the skin, or any measurable skin property. The information about the area of skin can be used to select a set of makeup effects from the plurality of makeup effects for presentation to the user. For example, if a user's skin is dry, makeup effects that include more moisturizing products may be selected. In some implementations, the information may be use to select product advertisements or special offers to the user (e.g., moisturizing products)

Figure 4:
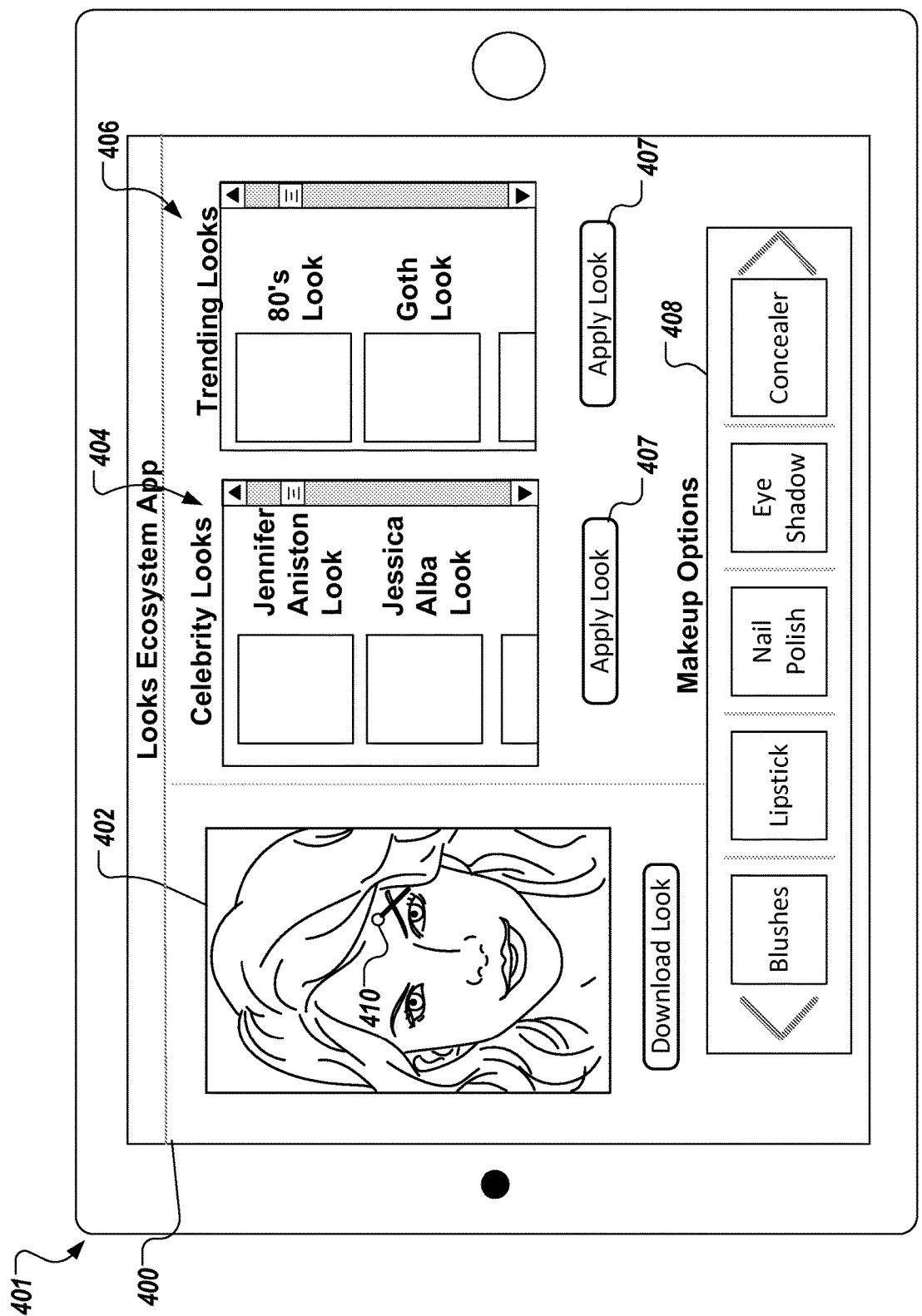
FIG. 4 depicts an example graphical user interface (GUI) that can be included in an example looks ecosystem application

FIG. 4 depicts an example GUI 400 that can be included in a looks ecosystem application on a computing device 401. GUI 400 includes an image window 402, a celebrity looks menus 404, and a style or trending looks menu 406, and a makeup options menu 408. A static or real-time video image of the user is displayed in the image window 402. For example, a user may capture or upload an image of an area of skin on which the user desires to apply a makeup effect such as the user's face. The user can select to preview different makeup effects, looks or makeup options from the menus 404, 406, 408, by applying them to the image. For example, a user may select a Jennifer Aniston look from the celebrity looks menu 404 and preview the look on the user's face in the image window 402. When the user selects a look, for example, by selecting an apply look button 407, the image of the user can be modified to show a preview of how the look may appear when applied to the user. For example, the data defining the selected makeup effect can be mapped to the image of the user in the image window 402.

If the user wishes to create a customized look, the user may select one or more makeup options from the makeup options menu 408. For example, the makeup options menu 408 can include makeup options such as blushes, lipsticks, nail polish, eye shadow, concealer, etc. that the user can apply to the image. In some examples, the user can apply a selected makeup option using cursors 410 of varying types and sizes depending upon the makeup option selected. For example, cursor 410 types and sizes can be modeled after various makeup applicators (e.g., brushes, touch up pens, sponges, or puffs). The makeup options menu 408 displays a sub-menus related to a selected makeup option. The sub-menu can allow the user to choose between various attributes a selected makeup option such as, for example, color, opacity, brand, or product line.

Once a user is satisfied with a chosen look or customized makeup effect, the user can choose to download data defining the makeup effect for use with an applicator device, as described above.

In some implementations, an image of the area of skin can be received from a first user. The image can be a real-time video image of the first user, for example, captured by a camera on the first user's computing device. The GUI including the image and makeup effects can be presented on both the first user's computing device and a separate computing device of a second user (e.g., a professional makeover specialist or a friend). The second user can apply the makeup effects to the image of the first user while the first user views the makeup effects being applied to the image. For example, the second user may be a professional cosmetologist and may create a professionally customized look for the first user. The first user and second user can interact and discuss the look as the second user creates it. For example, the GUI may include messaging, audio chat, or video chat, options. When the second user is finished creating a look, the first user can download the finalized makeup effects, and try the look out by applying the makeup effect to her skin using an applicator device, as described above.

In addition, some implementations can allow group makeovers. For example, a group of friends may connect using multiple computing devices through a looks ecosystem application. The GUI can permit the selection of a user to makeover (e.g., the first user), and anyone in the group can apply makeup effects to an image of the selected user. The members of the group can interact and discuss the look as they add makeup effects to the first user. When the first user's new look is finished, the first user can download the finalized makeup effects, and try the look out by applying the makeup effect to her skin using an applicator device, as described above.

A second aspect provides an interface for one or more remote users to add makeup indicators to a control layer associated with a graphical model of an area of skin (e.g., a face) of a local user. Makeup indicators can include makeup effects or symbols and makers to show the user how to apply cosmetics to improve their appearance. A registration layer provides a mapping between at least one control layer and a real-time image of the user based on the graphical mode. It buffers the control layers from the motion of the area of skin (e.g., the face), for example, the registration layer servers to translate indicators added to the control layer to the real-time image, so that the indicators appear to move and distort with the motion of the real-time image. That is, the indicators are mapped so as to appear to be applied to specific locations on the skin shown in the real-time image when the control layer is overlaid on the real-time image, and the indicators will move and change with the motion of the real-time image. For instance, if the user smiles, a lipstick markup effect will move and bend as if lipstick were applied to the moving lips of the user in the real-time image. However, the control layer on which indicators are being applied does not move with the real-time image or moves at a slow and more controlled rate to permit precise application and modification of the indicators. The real-time image, however, may move very rapidly, for example, if a local user is holding a computing device with only one hand.

In some implementations, the control layer can be moved independently of the real-time image. For example, a remote user can rotate the control layer to view a side of a local user's face to apply a makeup effect (e.g., blush), while the local user is viewing the opposite side of her face in the real-time image. For example, the remote operator can view the same real-time image as the local user. If the local user holds their computing device in one hand, the image could be too shaky for the remote user to accurately interact with. Thus, the registration layer permits independent motion of the control layer and the real-time image, while still allowing the users to view the real-time image with the indicators of the control layer overlaid on the real-time image. It is noted that the local user can tolerate and probably prefers the shake because they are the one inducing the shake, and this is more natural to the local user and similar to viewing one's image in a compact mirror.

In addition, the registration layer improves processing efficiency of the real-time image and the control layer because, for example, the indicators on the control layer do not need to be updated every time the user's face moves in real-time image. Furthermore, movements of the face in the real-time image can be mapped by the registration layer to the control layer so that the control layer does not need to be regenerated to track face motion. In other words, the control layer does not need to be recreated each time the face or area of skin moves, but only when such motion is desired to be mapped to the control layer.

Moreover, in some implementations indicators for a control layer can be generated by an algorithm for detecting blemishes on the area of skin. Such an algorithm can be resource intensive. Thus, by buffering the control layer from the motion in the real-time image, resources may be more efficiently distributed between a blemish detection algorithm and continued display of the real-time image. For instance, while processing the algorithm a computing device would not need to contend with continually updated data from the real-time image, and display of the real-time image may not be interrupted due to performing a computationally intensive algorithm on the real-time image.

Figure 5:
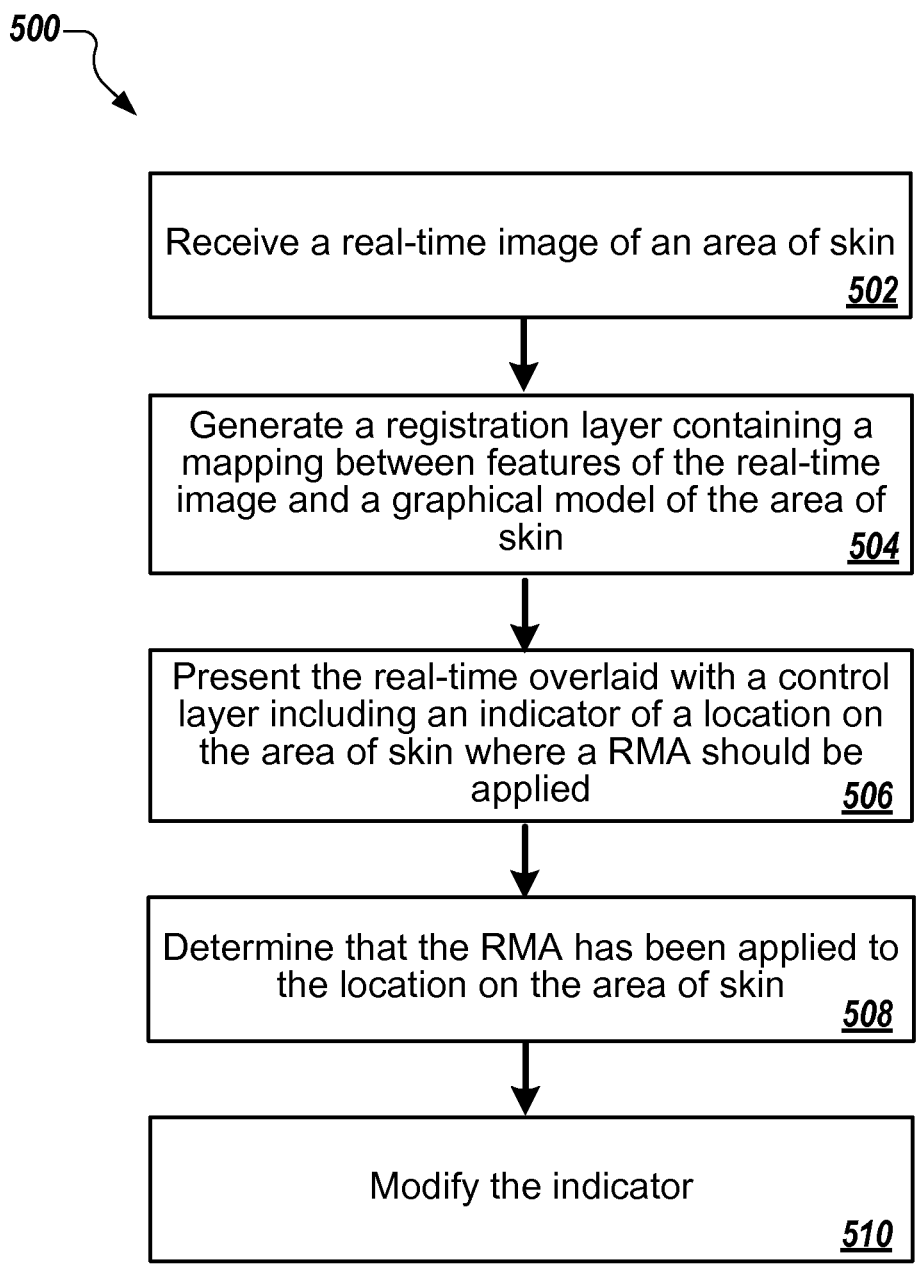
FIG. 5 depicts an example process that can be executed in accordance the second aspect of the present disclosure.

FIG. 5 depicts an example process 500 that can be executed in accordance with the second aspect of the present disclosure. In some examples, the example process 500 can be provided as one or more computer-executable programs executed using one or more computing devices. In some examples, the process 500 is executed to allow a user to gather and view input (e.g., symbols and markings) about how to improve her appearance on a real-time image of the user. More specifically, the process 500 may allow a multiple users to engage in a virtual makeover session using remotely linked computing devices. In some examples, the process 500 is executed from a looks ecosystem mirror application on a user computing device. In some examples, the process 500 is executed by accessing a looks ecosystem website with a user computing device.

A real-time image of an area of skin is received (502). For example, a user can scan her face or other area of skin using a camera on a computing device. A scan can include capturing a video of the user's face. A registration layer containing a mapping between features of the real-time image and a graphical model of the area of skin is generated (504). For example, a graphical model of the area of skin may have been previously generated and stored. In some implementations, the graphical model can be generated from several still images of the area of skin (e.g., face) from multiple angles. In some implementations, the graphical model can be generated by an applicator device from one or more scans of the area of skin with the applicator device.

For example, one or more control layers may be registered to an ideal model of a face such that makeup indicators included in the control layer(s) do not need to be moved each time the real-time image moves. The registration layer contains a mapping of how the additional layers such as a control layer and natural media layer should be warped to register to the moving real-time image of a face. Additionally, the mapping describes how the moving image of the face should be warped to map to other layers such a control layer so that a regeneration of the control layer does not need to track face motion.

For example, the area of skin (e.g., face) in the real-time image may move in three axis of position and three axis of rotation. This motion may be tracked by receiving an updated image of the face and determining the x-y coordinates in the image of at least three nonlinear features of the face. For example, the features may include the pupils of both eyes, the center of the nose and lips, ears, chin, extent of cheeks, or other features. A best-fit mapping in three-space of a model of the face allows the registration layer to be updated. The time to update the registration layer may be based on the update speed of the face image plus processing time, and is faster than performing a complete redrawing of control layers. In some examples, more control points on the face can be recognized to track, for example, the eyebrows or lips as they move with expression or speech.

A control layer overlaid on the real-time image according to the registration layer is presented for display to the user (506). The control layer includes at least one indicator of a location on the area of skin where a reflectance modifying agent (RMA) should be applied. For example, an indicator can include graphical symbols or shapes such as lines as drawn on the control layer by a remote user that guide the local user in applying cosmetics. For example, a "professional" such as a makeup artist or cosmetologist may draw and erase symbols and lines on a control layer associated with an image of a local user's face, similar to a football game plan, and thereby, guide and teach the local user new cosmetic application methods.

Moreover, an indicator also can include makeup effects such as predefined looks or makeup options applied to a control layer by a remote user to suggest a new look for a local user. For example, a group of friends may conference together through a looks ecosystem to share makeup ideas. Members of the group can make modifications to one or more control layers associated with an image of the friend being made over. When a control layer including makeup effects is overlaid on the real-time image, the makeup effects can simulate real pigments and dyes that may be placed over the real-time image and mapped by the registration layer to simulate real world application of cosmetics represented by the makeup effect.

The real-time image is used to determine that the RMA has been applied to the location on the area of skin covered by the indicator (508). For example, when the user applies an RMA, for example a blush, the reflectance of their skin will change where they applied the blush. The change in the reflectance of the indicated location on the area of skin may be detected in the real-time image. The indicator is then modified (510). For example, if the user applied the blush in the correct location, the appearance of the indicator (e.g., size, shape, color, opacity) can be modified or the indicator can be removed.

In some implementations, it may be necessary to update the registration layer faster than possible just by tracking features in the image as discussed above. For example, with a handheld computing device it may be desirable to simulate the effect of viewing the face in a pocket mirror, such as a compact. In a pocket mirror, small motions of the mirror translate to rapid translations of the image in the mirror. An accelerometer in the computing device, for example, a 6-axis accelerometer or gyroscope can be be used to extrapolate the most recent image tracking and bridge the time to the next image tracking data. This motion follows simple mirror reflection geometry to simulate mirror angle and position. For example, accelerometer data can be used to remove the effects of image stabilization processes.

Figure 6:
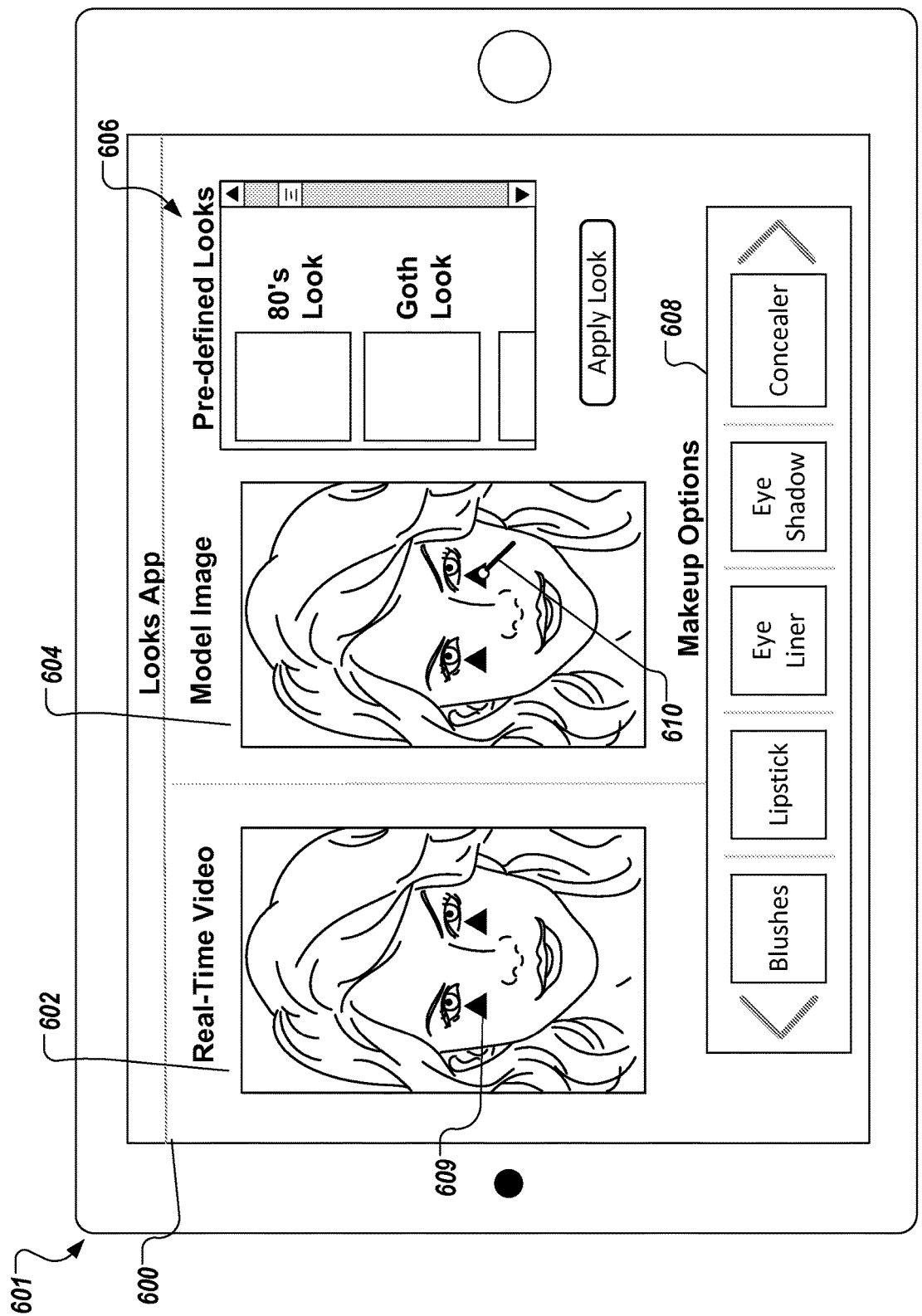
FIG. 6 depicts an example GUI that can be included in an example looks ecosystem application.

FIG. 6 depicts an example GUI 600 that can be included in a looks ecosystem application on a computing device 601. GUI 600 may be presented to a local user and one or more remote users, for example, during a social networking makeover session. GUI 600 includes a real-time image (e.g., video image) window 602, a model image window 604, a predefined looks menus 606, and a makeup options menu 608. A real-time video image of the local user is displayed in the real-time image window 602 with indicators 609 from to the control layer overlaid. The real-time image tracks the movement of the local user and indicators 609 from the control layer are mapped to the real-time image by the registration layer. The model image window 604 shows the control layer associated with the real-time image. In some implementations, the image in the model image window 604 can be moved by a user (e.g., the local or remote users) independently of the real-time image. In addition, indicators 609 such as makeup effects and symbols can be added to the control layer by, for example, a user drawing with a cursor 610 on the model image 604. For example, the makeup options menu 608 can include makeup options such as blushes, lipsticks, nail polish, eye shadow, concealer, etc. that the user can apply to the control layer in the model image window 604. Indicators 609 identifying applied makeup options can be represented as symbols (e.g., the triangles shown) or as shades representing an application of an actual physical product (e.g., eyeliner). In some implementations, different types of makeup (e.g., eyeliner vs. concealer) can be represented attributes of a symbolic indicator 609 (e.g., shape or color). The makeup options menu 608 displays a sub-menu related to a selected makeup option. The sub-menu can allow the used choose between various attributes a selected makeup option such as, for example, color, opacity, brand, or product line.

In some implementations, the GUI 600 presented to a local user may differ from that presented to remote users. For example, the GUI 600 presented to a local user may not include the model image window 604 and the menus 606 and 608. In some implementations, multiple users (e.g., two remote users) may be able to edit the same control layer cooperatively. In some implementations, each user may edit a separate control layer. In some implementations, a GUI 600 presented to a local user may contain options to select between one of multiple control layers. For example, a local user may be permitted to select among control layers generated by different remote users. In some implementations, multiple users (e.g., two remote users) may be able to edit the same control layer cooperatively.

Figure 7:
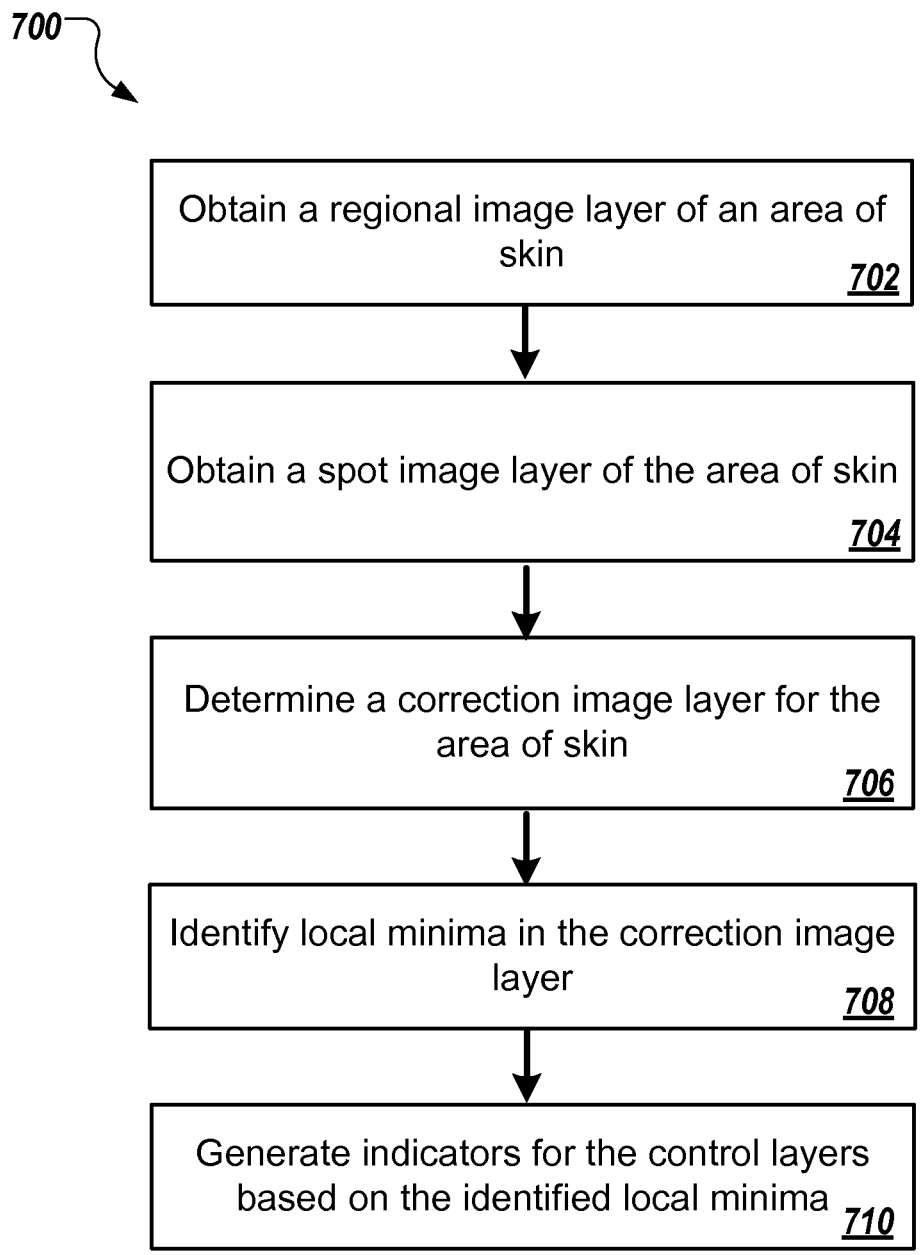
FIG. 7 depicts an example blemish detection process that can be executed in accordance with implementations of the present disclosure.

In some implementations, indicators for a control layer can be generated by an automatic blemish detection algorithm. For example, a blemish detection algorithm can detect blemishes that the eye is either poor at distinguishing or unable to distinguish in the middle spatial frequencies independently of other natural skin patterns. The blemish detection algorithm can use middle spatial frequencies to detect otherwise undetectable blemishes. FIG. 7 depicts an example blemish detection process 700 that can be executed in accordance with implementations of the present disclosure.

A regional image layer of the area of skin is obtained (702). For example, a regional image layer can be extracted from the real-time image. For instance, the regional image layer can include a frame of the real-time image. The regional image layer includes regional median values calculated around each pixel of a frame of the real-time image. The regional median around each pixel can be calculated for a region extending across a square about 0.4 inches across, for example. In some examples, a regional median around each pixel can be calculated for a region extending across a circle with a diameter of about 0.4 inches. In some examples a regional median around each pixel can be calculated for a dynamically computed shape outlining the extent of a region of skin. The size of the area used to compute the regional median can vary, for example, on larger areas of skin such as on the legs, a diameter of up to an inch or larger may be used. Furthermore, the median can be weighted to lighter values and rejects extreme values such as those caused by melanin deposits. For example, the median can be calculated using a 67%-33% weighting.

A spot image layer is obtained for the area of skin (704). The spot image layer includes blurred average values calculated across spot areas centered at each pixel of the frame of the real-time image. The diameter of each spot area can be similar the diameter of a manual retouch pen. Smaller diameters may result in better blemish detection; however, larger diameters may permit faster processing. For example, spot area diameters can range from 0.0625 inches to 0.25 inches. In some examples, 0.125 inches may represent a good compromise between blemish detection and processing speed.

A correction image layer is determined for the area of skin (706). For example, a correction image layer can be determined using the regional image layer and the spot image layer. A correction image layer can be calculated by dividing the spot image divided by the regional image layer. Locations in the correction image layer having values of less than unity indicate the desired application of a lightening pigment, and locations with values greater than unity indicate the desired application of a darkening pigment. In some examples, the order may be inverted or subtraction substituted for division with concurrent changes.

Locations having local minima are identified in the correction image layer (708), and indicators are generated for the control layer based on the minima (710). For example, the identified location are tagged and identified as indicators for inclusion in the control layer. For example, minima can be identified that are less than a defined threshold (e.g., 5%-10% below unity). Smaller percentages below unity provide a more perfect transformation, but at the cost of processing resources. In some examples, if two minima are located closer than a predetermined distance together (e.g., within 0.25 inches) one indicator may be generated for both minima.

Figure 8:
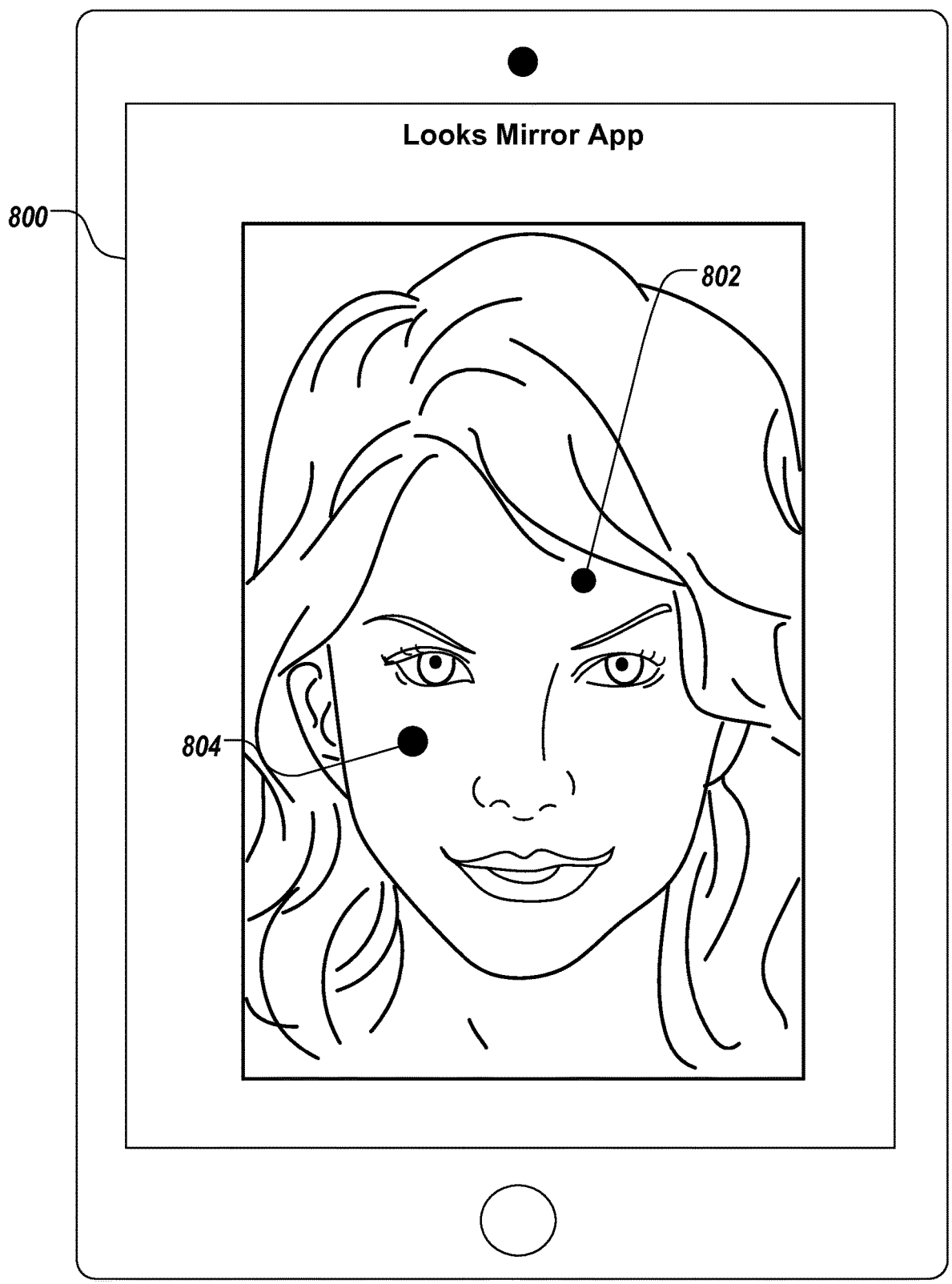
FIG. 8 depicts an example GUI including indicators generated by a blemish detection algorithm.

For example, FIG. 8 depicts an example GUI 800 including indicators 802 and 804 generated by a blemish detection algorithm. The indicators 802 and 804 direct a user to local minima or middle special frequency blemishes which would benefit from touch up with RMA and appear as markers, for example dots, on the user's face as she holds the device in her hands as she would hold a compact mirror. The indicator 802 directs the user to apply RMA just above her right eye, and indicator 804 directs the user to apply RMA to her right cheek. After the user applies RMA to one of the locations, for example, the location identified by indicator 802, the indicator 802 can be modified to show the user that she has either correctly applied the RMA or must apply more RMA. For example, if the user does not apply a sufficient amount of RMA, the indicator 802 may change color or may be shown as more transparent. If the user applies sufficient RMA then the indicator 802 may be removed. Moreover, similar to a mirror, the user's hand and RMA applicator (e.g., a retouch pen) would be shown in the real-time image as the user applies the RMA, and the indicators 802, 804 will remain mapped to the same location on the user's face if the user moves her head. Thus, the user can be precisely guided to apply RMA to the correct locations.

More specifically, referring back to FIG. 7, the process 700 can be repeated on subsequent frames of the real-time image to determine whether, and in some cases, how much RMA a user has applied manually. For example, the minima (maxima) values associated with a location on the area of skin will change after a user applies RMA. Correction image layers can be compared between multiple frames to determine whether the user has applied RMA and if so whether the user has applied a sufficient amount of RMA. The indicators associated with respective locations on the area of skin can be modified to provide feedback to the user. For example the color, size, shape, or opacity of an indicator can be changed. For example, if the user applies an insufficient amount for RMA to a particular location associated with an indicator (e.g., indicator 802), an attribute of the indicator can be changed, but the indicator will remain overlaid on the real-time image.

In some implementations, locations having local maxima are identified in the correction image layer, and indicators are generated for the control layer based on the maxima. For example, the identified location are tagged and identified as indicators for inclusion in the control layer. For example, minima can be identified that are greater than a defined threshold (e.g., 5%-10% below unity). For example, maxima may be indicated by indicators having different characteristics (e.g., size, shape, color) than those indicating minima. For example, maxima indicators may be dark, indicating that a user should apply a darkening RMA in those locations, while minima indicators may be light, indicating that a user should apply a lightening RMA in those locations.

The features described can be implemented in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what can be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer implemented method for applying cosmetics to an area of skin, the method comprising:
   receiving, by one or more processors, a real-time image of the area of skin;
   generating, by the one or more processors, a registration layer containing a mapping between features of the real-time image and a graphical model of the area of skin;
   presenting, for display to a user, a control layer overlaid on the real-time image according to the registration layer, the control layer including at least one indicator of a location on the area of skin where a reflectance modifying agent (RMA) should be applied, wherein an attribute of the at least one indicator signifies an amount of the RMA that should be applied to the location;

determining, based on the real-time image, that a first-applied amount of RMA has been applied to the location on the area of skin; and in response to determining that the first-applied amount of RMA has been applied to the location on the area of skin, modifying the attribute of the at least one indicator included in the control layer to signify a new amount of RMA that should be applied to the location.

2. The method of claim 1, further comprising sending, to a computing device for display to a second user, the control layer and the graphical model of the area of skin, the control layer being mapped to the graphical model according to the registration layer, wherein the at least one indicator included in the control layer is generated from an input received from the second user, the input identifying the location on the area of skin where the RMA should be applied.

3. The method of claim 1, further comprising sending, to a second computing device and a third computing device for display to a second user and a third user, the control layer and the graphical model of the area of skin, the control layer being mapped to the graphical model according to the registration layer, wherein the at least one indicator includes a first indicator and a second indicator, the first indicator being generated from a first input received from the second user, the first input identifying a first location on the area of skin where a first cosmetic should be applied, and the second indicator being generated from a second input received from the third user, the second input identifying a second location on the area of skin where a second cosmetic should be applied.

4. The method of claim 3, further comprising sending, to the second computing device and the third computing device for display to the second user and the third user, the real-time image of the area of skin, the control layer being mapped to the real-time image according to the registration layer.

5. The method of claim 1, further comprising generating the at least one indicator included in the control layer using an algorithm for detecting blemishes on the area of skin.

6. The method of claim 5, wherein the algorithm for detecting blemishes on the area of skin comprises:

obtaining a regional image layer comprising regional median values around each pixel of a frame of the real-time image of the area of skin;

obtaining a spot image layer comprising blurred average values across areas centered at each pixel of the frame of the real-time image of the area of skin;

determining a correction image layer based on the regional image layer and the spot image layer; and identifying at least one local minima in the correction image layer, wherein the at least one indicator included in the control layer is generated from the at least one local minima in the correction image layer.

7. The method of claim 1, wherein modifying the attribute of the at least one indicator included in the control layer to signify a new amount of RMA that should be applied to the location comprises:

adjusting a color, size, shape, or opacity of the at least one indicator.

8. A system comprising:

one or more processors; and one or more storage devices storing instructions that are operable, when executed by the one or more processors, to cause the one or more processors to perform operations comprising:

receiving a real-time image of an area of skin;

generating a registration layer containing a mapping between features of the real-time image and a graphical model of the area of skin;

presenting, for display to a user, a control layer overlaid on the real-time image according to the registration layer, the control layer including at least one indicator of a location on the area of skin where a reflectance modifying agent (RMA) should be applied, wherein an attribute of the at least one indicator signifies an amount of the RMA that should be applied to the location;

determining, based on the real-time image, that a first-applied amount of RMA has been applied to the location on the area of skin; and in response to determining that the first-applied amount of RMA has been applied to the location on the area of skin, modifying the attribute of the at least one indicator included in the control layer to signify a new amount of RMA that should be applied to the location.

9. The system of claim 8, wherein the operations further comprise sending, to a computing device for display to a second user, the control layer and the graphical model of the area of skin, the control layer being mapped to the graphical model according to the registration layer, wherein the at least one indicator included in the control layer is generated from an input received from the second user, the input identifying the location on the area of skin where the RMA should be applied.

10. The system of claim 8, wherein the operations further comprise sending, to a second computing device and a third computing device for display to a second user and a third user, the control layer and the graphical model of the area of skin, the control layer being mapped to the graphical model according to the registration layer, wherein the at least one indicator includes a first indicator and a second indicator, the first indicator being generated from a first input received from the second user, the first input identifying a first location on the area of skin where a first cosmetic should be applied, and the second indicator being generated from a second input received from the third user, the second input identifying a second location on the area of skin where a second cosmetic should be applied.

11. The system of claim 10, wherein the operations further comprise sending, to the second computing device and the third computing device for display to the second user and the third user, the real-time image of the area of skin, the control layer being mapped to the real-time image according to the registration layer.

12. The system of claim 8, wherein the operations further comprise generating the at least one indicator included in the control layer using an algorithm for detecting blemishes on the area of skin.

13. The system of claim 12, wherein the algorithm for detecting blemishes on the area of skin comprises:

obtaining a regional image layer comprising regional median values around each pixel of a frame of the real-time image of the area of skin;

obtaining a spot image layer comprising blurred average values across areas centered at each pixel of the frame of the real-time image of the area of skin;

determining a correction image layer based on the regional image layer and the spot image layer; and identifying at least one local minima in the correction image layer, wherein the at least one indicator included in the control layer is generated from the at least one local minima in the correction image layer.

14. The system of claim 8, wherein modifying the attribute of the at least one indicator included in the control layer to signify a new amount of RMA that should be applied to the location comprises:

adjusting a color, size, shape, or opacity of the at least one indicator.

15. A non-transitory computer-readable storage medium coupled to one or more processors and having instruction stored thereon which, when executed by the one or more processors, cause the one or more processors to perform operations for applying cosmetics to an area of skin, the operations comprising:

receiving, by one or more processors, a real-time image of the area of skin;

generating, by the one or more processors, a registration layer containing a mapping between features of the real-time image and a graphical model of the area of skin;

presenting, for display to a user, a control layer overlaid on the real-time image according to the registration layer, the control layer including at least one indicator of a location on the area of skin where a reflectance modifying agent (RMA) should be applied, wherein an attribute of the at least one indicator signifies an amount of the RMA that should be applied to the location;

determining, based on the real-time image, that a first-applied amount of RMA has been applied to the location on the area of skin; and in response to determining that the first-applied amount of RMA has been applied to the location on the area of skin, modifying the attribute of the at least one indicator included in the control layer to signify a new amount of RMA that should be applied to the location.

16. The non-transitory computer-readable storage medium of claim 15, wherein the operations further comprise sending, to a computing device for display to a second user, the control layer and the graphical model of the area of skin, the control layer being mapped to the graphical model according to the registration layer, wherein the at least one indicator included in the control layer is generated from an input received from the second user, the input identifying the location on the area of skin where the RMA should be applied.

17. The non-transitory computer-readable storage medium of claim 15, wherein the operations further comprise sending, to a second computing device and a third computing device for display to a second user and a third user, the control layer and the graphical model of the area of skin, the control layer being mapped to the graphical model according to the registration layer, wherein the at least one indicator includes a first indicator and a second indicator, the first indicator being generated from a first input received from the second user, the first input identifying a first location on the area of skin where a first cosmetic should be applied, and the second indicator being generated from a second input received from the third user, the second input identifying a second location on the area of skin where a second cosmetic should be applied.

18. The non-transitory computer-readable storage medium of claim 17, wherein the operations further comprise sending, to the second computing device and the third computing device for display to the second user and the third user, the real-time image of the area of skin, the control layer being mapped to the real-time image according to the registration layer.

19. The non-transitory computer-readable storage medium of claim 15, wherein the operations further comprise generating the at least one indicator included in the control layer using an algorithm for detecting blemishes on the area of skin.

20. The non-transitory computer-readable storage medium of claim 19, wherein the algorithm for detecting blemishes on the area of skin comprises:

obtaining a regional image layer comprising regional median values around each pixel of a frame of the real-time image of the area of skin;

obtaining a spot image layer comprising blurred average values across areas centered at each pixel of the frame of the real-time image of the area of skin;

determining a correction image layer based on the regional image layer and the spot image layer; and identifying at least one local minima in the correction image layer, wherein the at least one indicator included in the control layer is generated from the at least one local minima in the correction image layer.

* * * * *